Figures 1, 2:
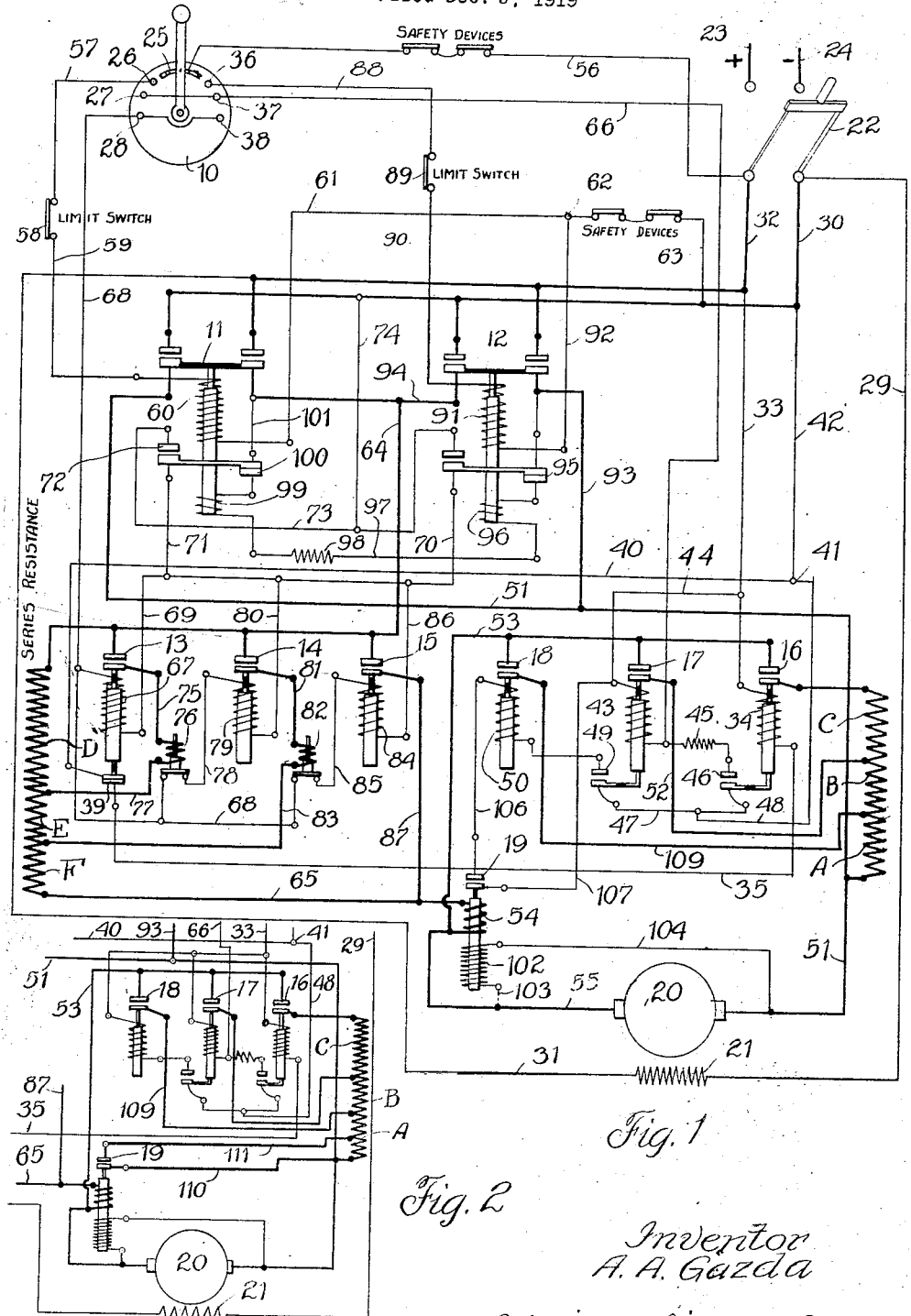

Inventor
A. A. Gazda

Patented June 17, 1924.

1,497,780

UNITED STATES PATENT OFFICE.

ADOLPH A. GAZDA, OF CHICAGO, ILLINOIS, ASSIGNOR TO KAESTNER & HECHT COMPANY, OF CHICAGO, ILLINOIS, A CORPORATION OF ILLINOIS.

MOTOR CONTROL.

Application filed December 3, 1919. Serial No. 342,205.

*To all whom it may concern:*

Be it known that I, ADOLPH A. GAZDA, a citizen of the United States, residing at Chicago, in the county of Cook and State of Illinois, have invented certain new and useful Improvements in Motor Control, of which the following is a specification.

My invention relates to controlling devices for electric motors, more especially motors intended to be started, stopped and reversed through a manually operated controller such, for instance, as the motors used to operate electric elevators.

An object of my invention is to provide means whereby when the controller is shifted to off position, the motor will be brought to rest after practically the same amount of motion regardless of the load the motor was carrying before the controller was moved to stop it.

Another object is to accomplish this result by relatively simple and reliable means comprising the least possible number of parts in addition to the usual mechanisms for controlling motors of this type.

In the present embodiment of my invention, I accomplish my object by automatically varying the braking effect produced by moving the controller to the off position to correspond with the conditions of loading existing at the time the controller is moved.

Special objects are to utilize part of the energy supplied by the motor when stopping, to operate automatic control means for preventing improper operation of the reversing switches and to eliminate the series holding relays usually employed to prevent closure of retarding switches until the amperage of the dynamic braking current has fallen to a definite value.

Further objects and advantages will become apparent as the description proceeds.

In the accompanying drawings, Figure 1 is a diagrammatic representation of the various mechanisms employed showing the arrangement of the wiring therefor. Fig. 2 is a view corresponding to a portion of Fig. 1 illustrating an alternative wiring arrangement for accomplishing the same result.

Referring to the drawings, I have illustrated a controller 10, main reversing switches 11 and 12, accelerating switches 13, 14 and 15, braking switches 16, 17 and 18 and a differentially operated relay switch 19 all appropriately connected for the control and operation of the motor, which comprises the armature 20 and the field 21. A hand switch 22 is adapted to connect the wiring system illustrated to suitable power mains 23 and 24. The controller illustrated has three speeds in either direction operated by moving the brush 25 over the contacts 26, 27 and 28 for motion in one direction and 36, 37 and 38 for motion in the other direction, but it will be obvious that the number of speeds is immaterial as far as my present invention is concerned.

*Initial off position.*

Closure of the hand switch 22 will excite the field 21 of the motor through a suitable wire 29 leading from the negative line 30 to the field 21, and another wire 31 from the field to the positive line 32. It will also supply operating current to the braking switches 16 and 17 as follows: from the positive line 32 through a wire 33 to the winding 34, from this winding through a wire 35 to the lower contact 39 of the accelerating switch 13, thence through a wire 40 to the connecting point 41 and through wire 42 to the negative line 30. The resulting closure of the switch 16 and its lower contacts 46 will supply current to the operating coil 43 of the switch 17 as follows: from the positive line through wires 33 and 44 to the coil 43, through the protecting resistance 45, contacts 46 and wires 47, 48 and 42 to the negative line. The closure of the switch 17 making a connection at contacts 49 will not supply current to the coil 50 of the third braking switch 18 as this circuit is open at the contacts of the differential switch 19 as will be more fully explained later.

The closure of the first and second retarding switches 16 and 17 establishes a dynamic braking circuit in the nature of a resistance shunted across the armature as follows: from the armature through wire 51 to the lower end of section A of the shunt resistance, through sections A and B and wire 52 to the contacts of switch 17 and through the common return wire 53 for the braking switches, and the wire 55 to the armature. This will be the arrangement of the circuits after the hand switch 22 has been closed and before the controller is operated.

*From rest to first speed up.*

Upon moving the brush 25 over contact 26 an operating circuit for the reversing switch 11 will be established as follows: from the positive line 32 through the wire 56 to the brush 25, through contact 26, wire 57, limit switch 58, wire 59, the coil 60 of the switch 11, and wire 61 to connecting point 62, and thence through wire 63 to the negative line. Suitable safety devices indicated on the drawing may be interposed between brush 25 and the positive line and between the coil 60 and the negative line, to prevent operation of the car when for any reason damage might result, for instance, when the door of the elevator shaft has not been closed. The limit switch 58 is placed as indicated in the circuit leading to the coil 60 and is arranged to be opened mechanically by movement of the car to the end of the elevator shaft.

Closure of the switch 11 establishes a power circuit through the armature 20 as follows: from the positive wire 32, through the contacts on switch 11, wire 64, sections D, E and F of series resistance, wire 65, the series coil 54 and wire 55 to the armature 20; from the armature 20 through wire 51 and the contacts of the switch 11 to the negative line 30. The dynamic braking circuit above described putting the sections A and B of the shunt resistance across the armature remains closed. It will thus be seen that the armature will be moved at a very slow speed.

*First to second speed up.*

Upon further movement of the brush 25 to touch contact 27 current will be delivered to a leader wire 66 connected as illustrated to a point between the coil 43 and the protecting resistance 45 thus connecting one end of coil 43 to the positive line. As the opposite end was before this movement of the controller drawing current by wires 33 and 44 from the positive line, the current through coil 43 will die out and switch 17 will open changing the dynamic braking circuit to insert section C of the braking resistance in said circuit through which current now flows as follows: through armature 20, through wire 51, sections A, B and C of the braking resistance, switch 16, return wire 53, and wire 55 back to the armature 20. The increase in the resistance of the shunt circuit will result in a corresponding increase in the motor speed.

*Second to third speed up.*

The final movement of the brush 25 will deliver current to contact 28 automatically bringing the motor by several intermediate steps to full speed. The initial contact establishes a circuit through the coil 67 of the first accelerating switch 13 as follows: from contact 28, through wire 68 to the coil 67, wire 69, to the common return wire 70 for all accelerating switches, then through wire 71 and the lower contacts 72 of switch 11, through wires 73 and 74 to the negative line. It will be seen that unless switch 11 has been properly closed when the motor was first started this circuit will be open and moving brush 25 onto the contact 28 will have no effect.

Operation of switch 13 makes two changes in the power supply to the motor. First the main contacts short-circuit section D of the series resistance through wire 75, series holding relay 76 and wire 77. Secondly, the opening of the lower contacts 39 interrupts the power circuit previously referred to through coil 34 of switch 16 which opens, interrupting the shunt circuit. As soon as the current through the armature has fallen below a predetermined value, series holding relay 76 will close delivering current through the common feed wire 68 for all the accelerating switches, wire 78, coil 79, and wire 80 to the common return wire 70, operating switch 14. Switch 14 short-circuits sections D and E of the series resistance through wire 81, series holding relay 82, and wire 83. Finally the series holding relay 82 will close supplying current to the coil 84 through wires 85 and 86 to close switch 15 which short-circuits the entire series resistance through wire 87. The motor is now running at full speed.

*Normal stopping and reversing.*

In returning the controller to the off position as soon as the brush 25 leaves contact 28 the feed for all the accelerating switches through wire 68 is gone and they open simultaneously, inserting all the series resistance. Immediately thereafter the lower contacts 39 of switch 13 will close completing the circuit through coil 34 and operating switch 16 to put sections A, B and C of the braking resistance in shunt across the armature. Further movement of the brush 25 past the contact 27 will disconnect wire 66 from the positive line whereupon coil 43 will take current from the positive line delivering it through protecting resistance 45, contacts 46 and wires 48 and 42 as already pointed out to the negative line. The resulting closure of switch 17 will short-circuit section C leaving sections A and B in shunt across the armature and further reducing the speed of the motor. Final movement of the controller to the off position will open the circuit through coil 60 allowing switch 11 to open and cutting off the supply of power from the motor, leaving the armature short-circuited through sections A and B which will soon bring the motor to a standstill.

In the devices of the prior art it has been customary to pass the dynamic braking current flowing from the terminals of switches 16 and 17 through series relays similar to 76 and 82 controlling the supply of current to the operating coil of the switch next in succession, which therefore would not operate until the dynamic braking current had decreased to a predetermined amperage. I have discovered that even in ordinary braking arrangements not involving my differential relay these series relays are unnecessary as the braking current only flows for a very short length of time and with the type of motors at present employed the heating effect of the current is never sufficient to do any damage. The necessity for such relays is still further diminished by the use of my differential relay which provides two entirely different braking connections and automatically selects the appropriate action. It is thus possible to arrange the braking circuit with enough resistance so that under the most extreme load conditions possible without breaking the mechanical connections between the motor and the elevator, the initial rush of current will not be large enough to do damage, and at the same time the braking effect obtainable will be large enough to completely stop the motor even when subjected to an overhauling load.

Movement of the controller arm in the opposite direction establishes a circuit through brush 25, contact 36, wire 88, limit switch 89, wire 90, coil 91, wire 92, to point 62 and thence to the negative line. It will be seen that this circuit is a duplicate of the operating circuit for switch 11 and that switch 12 is a duplicate of switch 11 having all its movable contacts connected to corresponding wires except that it connects the positive line 32 through wire 93 with wire 51 and the negative line 30 through wire 94 with wire 64. This is just the reverse of the connection established by switch 11 and the motor will therefore be actuated in the opposite direction. Further movement of the brush 25 to contacts 37 and 38 which are connected with contacts 27 and 28 respectively will operate to accelerate the motor in the identical way already described.

Reversing switch safety control.

I have provided means for automatically preventing the operation of either switch 12 or 11 after movement of the controller to the off position, until the motor has stopped. The brush 25 can therefore be instantaneously swung from one extreme position to the other without injuring the motor or its controls in any way. This means comprises a continuous shunt circuit which may be traced as follows: from armature 20 through wire 51 to wire 93, contacts 95 of the switch 12, holding coil 96, wire 97, resistance 98, holding coil 99, contacts 100 of the switch 11, wires 101 and 64 through as much of the series resistance as happens to be in circuit to the series coil 54 and though wire 55 back to the armature. The holding coils 96 and 99 may be designed to draw a materially larger current than coils 60 and 91 as the supply of energy to the holding coils occurs only at relatively rare intervals and very short periods of time. The resistance 98 may or may not be used depending on the design of the particular apparatus. The contacts 100 and 95 of switches 11 and 12 respectively are closed upon the opening of the main contacts. Therefore when the controller is moved to off position from either direction releasing either switch 11 or 12, the opening of said switch, the other switch being already open, will complete the holding circuit traced above and supply power to the holding coils 96 and 99 as long as the motion of the armature 20 maintains an electro-motive force in the circuit. It will thus be apparent that after moving the controller to the off position neither switch 11 nor switch 12 can be closed by operating the controller until the motor has practically come to rest. The brush 25 may, however, be moved from contact 28 to contact 26 and back again, to slow down and subsequently speed up without stopping, as the automatic holdout will only operate upon movement to or through the off position.

Automatic variation in braking effect.

The differential relay 19 is controlled by series coil 54 and a shunt coil 102 connected through wires 103 and 104 directly across terminals of the armature 20. The two coils 54 and 102 normally oppose each other when the motor is carrying a load and this relationship will not be changed by reversing the direction of the motor. For instance, if we assume that with switch 11 closed the current through coil 54 is in such a direction that it tends to close switch 19, and the potential of wire 55 is higher than that of wire 51, coil 102 should be wound so that the flow of current from wire 55 to wire 51 will pull down and tend to hold switch 19 open. Reversal of the motor by switches 11 and 12 will reverse the direction of the current flowing in coil 54 so that it will pull down, but the voltage of coil 102 will also be reversed so that it will push up and tend to close switch 19. The direction of the current in the shunt coil 102 will always depend only on the direction of the voltage delivered to the armature 20 from switches 11 and 12 but in case the load, instead of resisting the operation of the motor, pushes on it in the same direction in which it is moving, the motor will become a generator and pump current back into the power mains. This will reverse the direction of the current flowing in coil 54 which will co-operate with coil 102 and close switch 19. After the switch 19 has closed coil 102 will be strong enough to hold the switch in its closed position. This will complete a circuit through the upper contact 49 and coil 50 of the switch 18, wire 106, switch 19, wires 107 and 44, to the common return wire 33 for all the braking switches 16, 17 and 18. If this has occurred, movement of the controller to the off position will operate as above described in closing switches 16 and 17 but switch 18 will also act after the closure of switch 17, short-circuiting section B of the shunt resistance through wire 109 leaving the armature 20 shunted through section A only and exerting a much more powerful braking action on the motor than that resulting from a shunt connection through sections A and B.

It will thus be apparent that if the load on the motor has been overhauling or assisting the rotation of the motor so as to convert it into a generator a much more powerful braking action will be exerted to stop the motor when the controller is moved to off position than under normal load conditions. This result is particularly desirable in the operation of elevators where in descending with a heavy load, the elevator will coast a considerable distance past the desired stopping point if the operator throws the controller to the off position at the customary point in the motion of the car.

Referring to Fig. 2. All the connections for controlling the shunt resistance are identical with those illustrated in Fig. 1 except that switch 19 is not used to control the braking switch 18 which operates regularly after closure of switch 17 whenever the controller is moved to off position. Switch 19 has been connected through wires 110 and 111 to short-circuit a portion of section A of the shunt resistance. It will thus be seen that if switch 19 has been closed the braking effect on the motor when switch 16 closes will be increased in proportion to the amount of resistance short-circuited by switch 19 and that each step of the braking action will be thus increased.

While I have illustrated and described in detail two specific embodiments of my invention it should be clearly understood that the description is for purposes of illustration only and that many variations and modifications will obviously occur to those skilled in the art, such, for instance, as the use of two braking circuits, one of which always operates, and the other of which is rendered operative by actuation of the differential relay. I aim in the subjoined claims to cover all such legitimate modifications and variations.

I claim as my invention:

1. Controlling means for electric motors comprising, in combination, power mains, automatic electric devices adapted to retard and stop said motor when said power mains are disconnected from the armature of said motor, and means brought into operation by the action of said motor as a generator when overhauled by its load for re-adjusting said retarding devices to increase the automatic effect obtained thereby.

2. Controlling means for electric motors having, in combination, a dynamic braking circuit adapted to retard the motor, a plurality of switches adapted to operate in succession to increase the braking effect of said dynamic braking circuit, connections for certain of said switches first in sequence for actuating said switches according to the motion of the controller regardless of the load on the motor, connections for the remainder of said switches, and means interpolated in said last-mentioned connections to render the remainder of said switches operative or inoperative according to the load on said motor.

3. Controlling means for electric motors having, in combination, a controller, a dynamic braking circuit adapted to retard said motor, a series of switches adapted to operate in succession to increase the braking effect of said dynamic braking circuit, connections governed solely by said controller for actuating certain of said switches first in sequence, automatic control means adapted to be actuated upon the action of said motor as a generator, and connections controlled both by said automatic control means and by said controller for actuating the remainder of said switches.

4. Controlling means for electric motors having, in combination, a differentially operated relay comprising a series coil and an E. M. F. coil acting in opposition during normal operation of said motor and in unison when said motor acts as a generator, a dynamic braking circuit, and means controlled by said differential relay for varying the automatic action of said braking circuit obtainable by movement of said controller to the off position.

5. Controlling means for electric motors having, in combination, a dynamic braking circuit, a series of switches controlling said dynamic braking circuit, and operating connections for said switches, the connections for the first switch being extraneously controlled, and connections for each succeeding switch passing through contacts controlled by the operating switch whereby they operate successively, automatic control means responsive to variation in the load condition of the motor, the operating connections for certain of said series of switches last in succession passing through contacts operated by said automatic control means whereby said last-mentioned switches are rendered operative or inoperative according to the load condition of the motor.

6. Controlling means for electric motors having, in combination, a dynamic braking circuit including a shunt resistance, means for successively short-circuiting sections of said resistance to increase the braking effect, and automatic means responsive to variations in the load on the motor for short-circuiting a portion of the section of shunt resistance last in order of succession whereby the braking effect of all the successive steps of action of said dynamic braking circuit will be increased.

7. In a device of the class described, in combination with power mains and the armature of an electric motor, a resistance adapted to be connected as a whole or in sections in shunt across the terminals of said armature, automatic means for varying said resistance, and additional automatic means responsive to an abnormal load on the motor for reducing the resistance used to retard the motor below that used in normal operation.

8. In combination with power mains and the armature of an electric motor, a dynamic braking circuit, means for introducing a resistance in said circuit to exert a braking effect on said motor, and means responsive to an abnormal load condition of said motor for introducing a resistance having a greater braking effect than the resistance available during normal operation of said motor.

9. In combination with power mains and the armature of an electric motor, a shunt resistance adapted to be connected as a whole or in sections across the terminals of said armature, and automatic means responsive to an abnormal load condition of said motor for introducing a less resistance in the shunt circuit than that available during normal operation.

10. In combination with power mains and the armature of an electric motor, a controller, automatic means for braking said motor upon movement of the controller to the off position, and automatic means responsive to an abnormal load condition of said motor for securing a braking effect in excess of that attainable during normal operation.

11. In combination with power mains and the armature of an electric motor, a controller, a dynamic braking circuit, a plurality of switches adapted to successively increase the braking action of said circuit, the operating coil of each switch except the first being connected directly through terminals operated by the preceding switch to the power mains.

In testimony whereof, I have hereunto set my hand.

ADOLPH A. GAZDA.